United States Patent Office 3,553,176
Patented Jan. 5, 1971

3,553,176
PROCESS FOR MODIFYING POLYOLEFINS
Yoshisato Fujisaki, Tokyo, Itsuho Aishima, Nobeoka, Hisaya Sakurai, Kawasaki, and Atsushi Kitaoka, Hironobu Kawasaki, and Minoru Oshima, Nobeoka, Japan, assignors to Asahi Kasei Kogyo Kabushiki Kaisha, Osaka, Japan
No Drawing. Filed Aug. 22, 1967, Ser. No. 662,322
Claims priority, application Japan, Aug. 30, 1966, 41/57,197
Int. Cl. C08f 27/00, 27/06
U.S. Cl. 260—78.4
10 Claims

ABSTRACT OF THE DISCLOSURE

Process for modifying polyolefins which comprises reacting polyolefins with at least a modifier selected from the group consisting of sulfur, paraquinone dioxime and esters thereof, maleimide and derivatives thereof, halogenated benzoquinones, and unsaturated carboxylic acid and derivatives thereof, and, if required, inorganic additive by heating them in the presence of a tetravalent organotin compound.

BACKGROUND OF THE INVENTION

(1) Field of the invention

This invention relates to a process for modifying polyolefins, and more particularly, it relates to a process for chemically modifying polyolefins to improve the thermal and mechanical properties thereof.

(2) Description of the prior art

Although various polyolefins having specific properties useful as high molecular polymers have been known heretofore, the polyolefins as the raw materials in the various fields are required to have still higher standard of performance and combination of excellent properties as the development in the industry as a whole has made great strides. In order to meet such growing demand, there have been proposed a number of methods of modifying polyolefins. For example, as a method of modifying the thermal and mechanical properties of olefin polymers, many attempts have been devoted heretofore in chemically cross-linking olefin polymers and, as a matter of fact, there have been proposed heretofore a number of processes for cross-linking olefin polymers by using peroxides.

However, the prior art processes making the use of peroxides have a common disadvantage in that most of peroxides used as cross-linking agents are lost because of considerably high rates of decomposition at temperatures in the vicinity of the melting point of polyolefin, and as a result, a great restriction is imposed on the moulding process comprising steps of mixing the peroxides with molten polyolefin, cross-linking them and moulding the resulting mixture into desired shaped articles.

SUMMARY OF THE INVENTION

It is, therefore, an object of this invention to provide a process for the production of modified polyolefin having improved thermal and mechanical properties.

It has now been found that the object of this invention may be accomplished by the process of this invention which comprises reacting olefin polymers with at least a member selected from the group consisting of sulfur, paraquinone dioxime and esters thereof, maleimide and derivatives thereof, halogenated benzoquinones, and unsaturated carboxylic acids and derivatives thereof by heating them in the presence of tetravalent organotin compound as a catalyst.

Polyolefins or olefin polymers referred to herein include mono-olefin homopolymers such as high density and low density polyethylene, polypropylene, polybutene-1, poly-3-methyl-butene-1 and poly-4-methyl-pentene-1; and copolymers of mono-olefin and other olefins or vinyl monomers such as ethylene/propylene copolymer, ethylene/propylene block copolymer, ethylene/butene copolymer, ethylene/vinyl acetate copolymer, ethylene/ethylacrylate copolymer and propylene/4-methyl-pentene-1 copolymer; and mixtures of two or more kinds of the homopolymers or copolymers.

While any tetravalent organotin compounds may be conveniently used as a catalyst in the process of this invention, typical examples thereof include the organotin compounds of the general formulae:

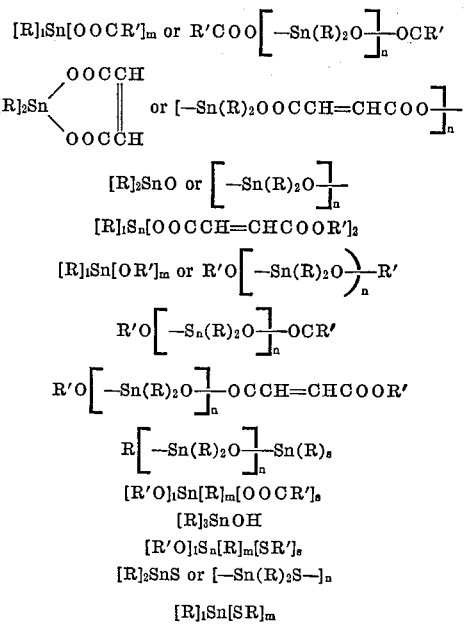

wherein R which may be the same or different represents alkyl, allyl, aryl, benzyl or cyclohexyl groups; R' which may be the same or different represents alkyl, aryl or cycloalkyl groups which may contain substituents; X represents halogen; 1, $m$ and $s$ represent integers of 1, 2 or 3; $1+m+s$ makes 4 and $n$ represents a degree of polymerization.

The modifiers which may be used in the process of this invetion include sulfur, paraquinone dioxime and derivatives thereof such as dibenzoylquinone dioxime and dilaurylquinone dioxime; maleimide and derivatives thereof such as m-phenylenedimaleimide, p-phenylenemaleimide, ethylenedimaleimide and N-phenylmaleimide; halogenated benzoquinones such as tetrachlorobenzoquinone; and unsaturated carboxylic acids and derivatives thereof such as maleic acid, maleic anhydride, sodium maleate, calcium maleate, itaconic acid, ethyl itaconate, cinnamic acid and crotonic acid. These compounds exemplified above may be used in admixture of two or more kinds depending upon the purpose of modification contemplated.

We have found by this time that the aforementioned organotin compounds have a powerful ability in lowering the molecular weight of α-olefin polymers at a high temperature, e.g., 210–350° C., and completed the processes for improving the processability of α-olefin polymers as described in Japanese patent publication Nos. 1,729/63, 4,175/63, 1,516/64, 1,811/64, 5,767/64 and 6,276/66 on the basis of such a finding.

Our further study of the process mentioned above has led to a surprising finding in that the tetravalent organotin compounds are useful as catalysts in the chemical modification of olefin polymers and the process of this invention has its basis on such a novel finding.

More specifically, we have found that a mere mixing of sulfur, paraquinone dioxime or esters thereof, maleimide compounds, halogenated benzoquinones or unsaturated carboxylic acids or derivatives thereof, which may be used as the modifiers in the process of this invention, with olefin polymers and the subsequent heating of the resulting mixture lead to little or no reaction of these reactants and it is completely unsatisfactory in modifying olefin polymers practically, whereas a remarkable reaction takes place in a very short period of time if these reactants are heated in the presence of the organotin compound according to the process of this invention.

In practising the process of this invention, the amounts of the catalysts and modifiers used are variable depending upon the reaction conditions used and the purpose of modification contemplated. However, in general, 0.01 to 10% by weight of catalysts and modifiers based on the weight of olefin polymers are used, respectively.

The reaction temperature in the process of this invention also varies depending upon the types of olefin polymers to be modified and the organotin compounds used.

However, in general, a temperature of from 200 to 350° C., and preferably from 210 to 320° C., is used. At temperatures below 200° C., the effect of the organotin compound is unexpectable, and at temperatures exceeding 350° C., the adjustment of the reaction becomes very difficult due to the high rate of reaction in the reaction system.

Although the reaction period required in the process of this invention varies somewhat depending upon the type of the starting polymers, the type of the catalysts and modifiers employed and the reaction conditions such as the reaction temperature used, normally, a reaction time of from several minutes to 10 and some odd minutes should be sufficient since the reaction is proceeded very quickly.

In practising the process of this invention, the use of inorganic additives together with the modifiers greatly aids in the modification contemplated in the present invention. The inorganic additives which may be used in the process of this invention are inorganic substances such as carbon black, zinc oxide, calcium carbonate, silica, talc, kieselguhr, mica, asbestos and glass fiber in the form of powder, sheet or fiber.

The process of this invention may be carried out in the presence of pigments, stabilizers, and plasticizers without causing any inconvenience.

The process of this invention has advantages in that the modifiers can be dispersed homogeneously over the molten olefin polymers due to the fact that the reaction according to this invention is carried out at a high temperature, e.g., above 200° C., and in general, above 210° C., and that the control in the moulding process can be accomplished easily and that it can be readily and easily applicable to the modification of polymers having higher melting points.

The process of this invention may improve various properties of olefin polymers and particularly, there may be brought about the improvements in the heat distortion temperature, hardness, elasticity, tensile strength and creep behavior.

DESCRIPTION OF THE PREFERRED EMBODIMENTS

The following examples will serve to illustrate this invention more fully and practically. It should not be construed, however, that these examples restrict this invention as they are given merely by way of illustration:

In the following examples, percentages are by weight unless otherwise indicated, and the tensile modulus, Rockwell hardness and heat distortion temperature of the modified polymers obtained were measured and evaluated on the following basis:

The test pieces were prepared by compression moulding the modified polymers obtained in the respective examples, and the resulting test pieces were conditioned for 72 hours before measuring the following physical properties according to ASTM Standards:

Tensile modulus ASTM D638–61T unit—kg./mm.$^2$, cross-head speed 0.2 in./min.
Rockwell hardness ASTM D785–51 unit—R Scale
Heat distortion temperature ASTM D648–58T unit—° C. (fiber stress 66 p.s.i.)

EXAMPLE 1

To a powdered polypropylene having an intrinsic viscosity of 9.2 as measured in a tetralin at 135° C. and 98.2% of a portion insoluble in boiling n-heptane were incorporated 0.2% by weight of dibenzyl-tin-oxide and 2.0% by weight of m-phenylenedimaleimide based on the weight of polypropylene. The resulting mixture was kneaded by a roll-mill at 230° C. in nitrogen atmosphere for a predetermined period of time.

For comparison, there were knealed under the same conditions mixtures containing either dibenzyl-tin-oxide or m-phenylenedimaleimide, respectively alone, and polypropylene containing none of these.

The intrinsic viscosities of the resulting polymers and the formation of gel measured in terms of the insoluble portion in hot xylene are shown in the following Table I:

TABLE 1

| Comparative Example Nos. | Amounts of catalyst and modifier used (percent)* | | Kneading period (min.) | Intrinsic viscosity | Gel formation (percent) |
| --- | --- | --- | --- | --- | --- |
| | Dibenzyl-tin-oxide | m-Phenylene-dimaleimide | | | |
| 1 | | | 5 | 7.8 | |
| | | | 15 | 7.2 | |
| | | | 20 | 6.8 | |
| 2 | 0.2 | | 5 | 1.7 | |
| | | | 15 | 1.5 | |
| | | | 20 | 1.4 | |
| 3 | | 0.2 | 5 | 7.6 | |
| | | | 15 | 7.1 | |
| | | | 20 | 6.8 | |
| Example 1 | 0.2 | 2.0 | 5 | | 28 |
| | | | 15 | | 34 |
| | | | 20 | | 39 |

* By weight based on the weight of polypropylene.

The modified polymers obtained according to the process of this invention are not mere mixture of olefin polymers and the modifiers mentioned above but are polymers having chemical linkages between olefin polymers and the modifiers, i.e., cross-linked polymers.

It can be noted from the Comparative Examples that the use of dibenzyl-tin-oxide alone tends to remarkably decompose polypropylene at 230° C., and the use of m-phenylenedimaleimide alone gives rise to no cross-linking. On the other hand, the considerable formation of gel is observed in Example 1 in which both dibenzyl-tin-oxide and m-phenylenedimaleimide are used, and thus, it is quite clear that the cross-linking reaction is effected by the use of both dibenzyl-tin-oxide and m-phenylenedimaleimide.

The modified polymer obtained by the kneading of 15 minutes in Example 1 was compression-moulded to give a test piece and the heat distortion temperature thereof was measured to be 128° C., showing an improvement by about 20° C. over 104–109° C. as measured with test pieces obtained in Comparative Examples.

EXAMPLES 2–3

To a powdered polypropylene having a Melt Index of 1.9 and 98.2% of a portion insoluble in boiling n-heptane were incorporated various amounts of di-tert-butyltin-oxide and p-quinone dioxime and the resulting mixtures were extruded at 220° C. in nitrogen atmosphere by using a 40 mm. diameter screw extruder. The residence time of these mixtures in the extruder was 5 minutes.

For comparison, there were extruded under the same conditions mixtures containing either di-tert-butyltin-oxide or p-quinone-dioxime, respectively alone, and polypropylene containing none of these. The test pieces were prepared from the resulting granular polymers and the physical properties thereof were measured. The results are shown in the following Table 2:

EXAMPLE 4

To polyethylene pellets having a melt index of 2.1 and specific gravity of 0.955 were incorporated 0.5% by weight of m-phenylenedimaleimide based on the weight of polyethylene and the resulting mixture was kneaded by a roll-mill at 170° C. in nitrogen atmosphere for 10 minutes. No increase in the melt index of polyethylene was observed in the meantime. The resulting mixture was compressed at 230° C. for 10 minutes by using a compression-moulding machine to effect the hardening and moulding to give a test piece.

The gel content of the shaped article was 26% and the heat distortion temperature was 85° C. The value shows a remarkable improvement over the heat distortion temperatures of 72–74° C. as measured with the test piece of polyethylene or the test piece obtained from the polymer prepared according to the same procedures as described aboae except that 2.0% of m-phenylenedimaleimide alone was incorporated.

EXAMPLES 5–9

To the same powdered polypropylene as used in Examples 2–3 were incorporated various amounts of dibenzyltin-oxide and various types and amounts of compounds as specified in the following Table 3, and the resulting mixtures were extruded at 230° C. in nitrogen atmosphere by using a 40 mm. diameter screw extruder. The heat distor-

TABLE 2

| Comparative Example Nos. | Amounts of catalyst and modifier used (percent)* | | Melt index 230° C. 2.16 kg. | Tensile modulus (kg./mm.$^2$) | Rockwell hardenss (R scale) | Heat distortion temperature (°C.) |
| --- | --- | --- | --- | --- | --- | --- |
| | Di-tert-butyltin-oxide | p-Quinone dioxime | | | | |
| 4 | | | 2.3 | 120 | 84 | 105 |
| 5 | 0.5 | | 18.0 | 119 | 85 | 103 |
| 6 | | 3.0 | 2.5 | 118 | 85 | 105 |
| Examples: | | | | | | |
| 2 | 0.5 | 1.0 | 1.8 | 141 | 93 | 122 |
| 3 | 0.5 | 0.3 | 1.3 | 148 | 95 | 124 |

* By weight based on the weight of polypropylene.

The formation of gel was examined by determining the solubilities of the resulting polymers in hot-xylene. As a result, the polymers obtained in Comparative Examples were completely dissolved in hot-xylene, whereas the formations of a large amount of gel were observed with the polymers obtained in Examples 2 and 3.

It can be noted from the above results that the cross-linking reaction of polypropylene is enhanced by heating in the coexistence of di-tert-butyltin-oxide and p-quinone dioxime, and that both the tensile modulus and hardness are improved by 10–20%, as well as the heat distortion temperature which is raised by about 20° C., and thus, the effect of the use of both di-tert-butyltin-oxide and p-quinone dioxime is definite and significant.

tion temperatures and the hardness of the resulting polymers are shown in the following Table 3.

TABLE 3

| Comparative Examples Nos. | Amount of catalyst and modifier used (percent)* | | Rockwell hardness (R scale) | Heat distortion temperature (° C.) |
| --- | --- | --- | --- | --- |
| | Dibenzyl-tin-oxide | Type of compound used | | |
| 7 | | | 83 | 104 |
| 8 | 0.5 | | 83 | 103 |
| 9 | | p-Phenylenedimaleimide 3.0 | 82 | 104 |
| 10 | | Dibenzoylbenzoquinone dioxime 3.0 | 81 | 103 |
| 11 | | Sulfur 3.0 | 83 | 103 |
| 12 | | Sodium cinnamate 3.0 | 85 | 105 |
| 13 | | Tetrachlorobenzoquinone 3.0 | 83 | 102 |
| Examples: | | | | |
| 5 | 0.5 | p-Phenylenedimaleimide 3.0 | 93 | 123 |
| 6 | 0.5 | Dibenzoylbenzoquinone dioxime 3.0 | 90 | 120 |
| 7 | 0.5 | Sulfur 3.0 | 88 | 112 |
| 8 | 0.5 | Sodium cinnamate 3.0 | 92 | 119 |
| 9 | 0.5 | Tetrachlorobenzoquinone 3.0 | 94 | 121 |

*By weight based on the weight of polypropylene.

EXAMPLES 10–11

To the same polypropylene as used in Examples 2–3 were incorporated 0.5% by weight of dibenzyl-tinoxide, 3.0% by weight of maleic anhydride and 10% by weight of zinc oxide based on the weight of polypropylene and the resulting mixture was extruded at 220° C. in nitrogen atmosphere by using a 40 mm. diameter screw extruder.

The above experiment was repeated according to the same procedures to give a modified polymer except that the zinc oxide was omitted.

For comparison, the sample polymers containing only dibenzyl-tin-oxide and zinc oxide; zinc oxide alone; and neither catalyst nor modifier were prepared.

The heat distortion temperature and hardness of the resulting polymers were measured. The results are shown in the following Table 4:

TABLE 4

| Comparative Example Nos. | Amount of catalyst and modifier used (percent)* | | | Rockwell hardness (R scale) | Heat distortion temperature (° C.) |
|---|---|---|---|---|---|
| | Dibenzyltin-oxide | Maleic acid anhydride | Zinc oxide | | |
| 14 | | | | 84 | 105 |
| 15 | 0.5 | | 10 | 90 | 115 |
| 16 | | | 10 | 89 | 115 |
| Examples: | | | | | |
| 10 | 0.5 | 3.0 | | 88 | 112 |
| 12 | 0.5 | 3.0 | 10 | 99 | 131 |

*By weight based on the weight of polypropylene.

It is clearly noted from the results shown above that the effect of modification is remarkedly promoted by the use of zinc oxide in combination with dibenzyl-tin-oxide and maleic anhydride.

What is claimed is:

1. Process for modifying polyolefins which comprises reacting polyolefins with at least a modifier selected from the group consisting of sulfur, paraquinone dioxime and esters thereof, maleimide and derivatives thereof, halogenated benzoquinones, and unsaturated carboxylic acid and derivatives thereof by heating them in the presence of a tetravalent organotin compound.

2. A process according to claim 1 wherein said polyolefin is a member selected from the group consisting of homopolymers of a member selected from the group consisting of ethylene, propylene, butene-1, 3-methyl-butene-1 and 4-methyl-pentene-1; copolymers and block polymers of the abovementioned mono-olefin monomers with the other mono-olefin monomers; and copolymers of the above-mentioned monoolefin monomers with vinyl monomers.

3. A process according to claim 1 wherein said tetravalent organotin compound is a member selected from the group consisting of the organotin compounds represented by the following formulae:

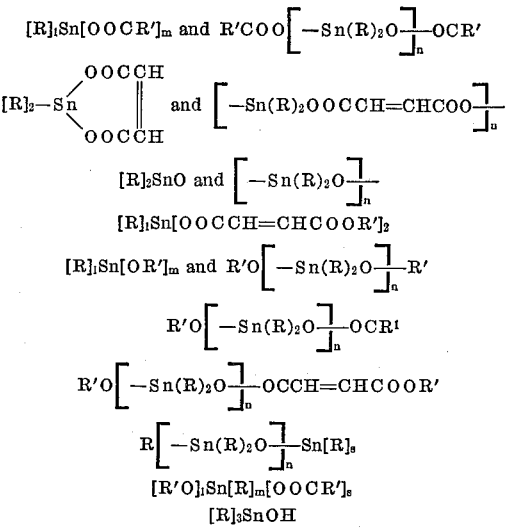

wherein R which may be the same or different represents a member selected from the group consisting of alkyl, allyl, aryl, benzyl and cyclohexyl groups; R' which may be the same or different represents a member selected from the group consisting of alkyl, aryl and cycloalkyl groups which may contain substituent, X represents halogen; 1, $m$ and $s$ represent integers of 1, 2 or 3; $1+m+s$ makes 4; and $n$ represents a degree of polymerization.

4. A process according to claim 1 wherein said modifier is a member selected from the group consisting of sulfur, paraquinone dioxime, dibenzoylquinone dioxime, dilaurylquinone dioxime, maleimide, m-phenylenedimaleimide, p-phenylenemaleimide, ethylenedimaleimide and N-phenylmaleimide, tetrachlorobenzoquinone, maleic acid, maleic anhydride, sodium maleate, calcium maleate, itaconic acid, ethyl itaconate, cinnamic acid and crotonic acid.

5. Process for modifying polyolefins which comprises reacting polyolefins with at least a modifier selected from the group consisting of sulfur, paraquinone dioxime and esters thereof, maleimide and derivatives thereof, and unsaturated carboxylic acid and derivatives thereof and inorganic additive by heating them in the presence of a tetravalent organotin compound.

6. A process according to claim 4, wherein said modifier is sulphur.

7. A process according to claim 1, wherein said modifier is selected from the group consisting of maleimide and derivatives thereof.

8. A process according to claim 1 wherein said modifier is a halogenated benzoquinone.

9. A process according to claim 1 wherein said modifier is selected from the group consisting of unsaturated carboxylic acids, and anhydrides and esters thereof.

10. A process according to claim 1, wherein said modifier is selected from the group consisting of paraquinone dioxime and esters thereof.

References Cited

UNITED STATES PATENTS

| 2,561,814 | 7/1951 | Novotny | 260—2 |
| 3,226,356 | 12/1965 | Kehr et al. | 260—41 |
| 3,245,978 | 4/1966 | Gregorian et al. | 219—345 |
| 3,264,230 | 8/1966 | Proops | 260—2 |
| 3,297,641 | 1/1967 | Werber et al. | 260—66 |
| 3,068,212 | 12/1962 | Jenkins | 260—85.5 |
| 3,167,473 | 1/1965 | Leebrick | 167—38.6 |

JAMES A. SEIDLECK, Primary Examiner

J. KIGHT, Assistant Examiner

U.S. Cl. X.R.

260—79.5, 88.2, 86.7, 87.3, 94.9, 878